(12) United States Patent
Abercrombie et al.

(10) Patent No.: US 11,874,516 B2
(45) Date of Patent: Jan. 16, 2024

(54) FLEXIBLE, NON-PREFERENTIAL BEND JACKETS FOR OPTICAL FIBER CABLES

(71) Applicant: CORNING RESEARCH & DEVELOPMENT CORPORATION, Corning, NY (US)

(72) Inventors: Jessica Ruth Abercrombie, Newton, NC (US); Kevin Nicholas Ball, Hickory, NC (US); Xiaole Cheng, Painted Post, NY (US); Jason Clay Lail, Conover, NC (US); Rebecca Elizabeth Sistare, Hickory, NC (US); Ellen Anderson Stupka, Statesville, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 17/243,941

(22) Filed: Apr. 29, 2021

(65) Prior Publication Data
US 2021/0247579 A1    Aug. 12, 2021

Related U.S. Application Data

(63) Continuation of application No. PCT/US2019/058253, filed on Oct. 28, 2019.
(Continued)

(51) Int. Cl.
*G02B 6/44*    (2006.01)
*G02B 6/46*    (2006.01)

(52) U.S. Cl.
CPC ......... *G02B 6/4432* (2013.01); *G02B 6/4433* (2013.01); *G02B 6/44384* (2023.05); *G02B 6/567* (2023.05)

(58) Field of Classification Search
CPC ..... G02B 6/4432; G02B 6/567; G02B 6/4433
See application file for complete search history.

(56) References Cited

U.S. PATENT DOCUMENTS

| | | | | |
|---|---|---|---|---|
| 4,730,894 A | * | 3/1988 | Arroyo | G02B 6/443 385/113 |
| 5,878,180 A | * | 3/1999 | Nothofer | G02B 6/4411 385/114 |

(Continued)

FOREIGN PATENT DOCUMENTS

| | | | |
|---|---|---|---|
| CN | 201307177 Y | * | 9/2009 |
| CN | 105549168 A | | 5/2016 |

(Continued)

OTHER PUBLICATIONS

International Search Report and Written Opinion of the International Searching Authority; PCT/US2019/058253; dated Jan. 15, 2020, 10 pages; European Patent Office.

(Continued)

*Primary Examiner* — Charlie Y Peng
(74) *Attorney, Agent, or Firm* — Thomas R. Irwin

(57) ABSTRACT

Embodiments of the disclosure relate to an optical fiber cable. The optical fiber cable includes a cable jacket having an inner surface and an outer surface in which the inner surface defines a central bore along a longitudinal axis of the optical fiber cable and the outer surface defines the outermost extent of the cable. The optical fiber cable also includes at least one access feature disposed in the cable jacket between the inner surface and the outer surface. Further included are a first plurality of optical fiber bundles. Each optical fiber bundle includes a second plurality of optical fiber ribbons that has a third plurality of optical fibers arranged in a planar configuration. The optical fiber cable (Continued)

bends uniformly in all directions transverse to the longitudinal axis of the optical fiber cable.

15 Claims, 7 Drawing Sheets

Related U.S. Application Data

(60) Provisional application No. 62/754,933, filed on Nov. 2, 2018.

(56) References Cited

U.S. PATENT DOCUMENTS

| | | | | |
|---|---|---|---|---|
| 6,317,542 B1 * | 11/2001 | Hardwick, III | ...... | G02B 6/4433 385/112 |
| 6,430,344 B1 * | 8/2002 | Dixon | ............ | G02B 6/443 385/113 |
| 7,406,233 B2 * | 7/2008 | Seddon | ............ | G02B 6/4433 385/100 |
| 8,705,921 B2 | 4/2014 | Blazer et al. | | |
| 9,651,753 B2 | 5/2017 | Hurley et al. | | |
| 10,294,354 B2 * | 5/2019 | Bringuier | ............ | G02B 6/443 |
| 11,287,591 B2 * | 3/2022 | Shimizu | ............ | G02B 6/4432 |
| 2001/0007604 A1 * | 7/2001 | Lail | ............ | G02B 6/4411 385/112 |
| 2002/0118933 A1 | 8/2002 | Dixon et al. | | |
| 2004/0240808 A1 | 12/2004 | Rhoney et al. | | |
| 2004/0258372 A1 | 12/2004 | Risch et al. | | |
| 2013/0018150 A1 | 1/2013 | Walton et al. | | |
| 2013/0287346 A1 * | 10/2013 | Gimblet | ............ | G02B 6/4495 385/100 |
| 2014/0029903 A1 | 1/2014 | Blazer et al. | | |
| 2014/0219617 A1 * | 8/2014 | Homma | ............ | G02B 6/4432 385/104 |
| 2017/0235069 A1 | 8/2017 | Risch et al. | | |
| 2018/0254126 A1 | 9/2018 | Esseghir et al. | | |

FOREIGN PATENT DOCUMENTS

| | | | | |
|---|---|---|---|---|
| EP | 1324091 | A2 | 7/2003 | |
| EP | 3447558 | A1 | 2/2019 | |
| GB | 1568178 | A * | 5/1980 | ............ G02B 6/4432 |

OTHER PUBLICATIONS

European Patent Application No. 19880841.2, Extended European search report, dated Jun. 22, 2022; 08 pages; European Patent Office.

* cited by examiner

FLEXIBLE, NON-PREFERENTIAL BEND JACKETS FOR OPTICAL FIBER CABLES

CROSS-REFERENCE TO RELATED APPLICATIONS

This application is a continuation of International Application No. PCT/US2019/058253 filed on Oct. 28, 2019, which claims the benefit of priority under 35 U.S.C. § 119 of U.S. Provisional Application Ser. No. 62/754,933, filed Nov. 2, 2018, the content of each of which is relied upon and incorporated herein by reference in their entirety.

BACKGROUND

The present invention is related to optical fiber cables and more particularly to optical fiber cables having cable sheaths that bend uniformly. Some polyolefins have advantageous properties for use as cable jacketing materials for a variety of cable types. In particular, these polyolefins have good flexibility and are able to maintain certain relevant mechanical properties over a range of operating temperatures. The polyolefins can be extruded to surround the cable so as to help protect the interior components of the cable from the environment in which the cable is deployed. Additional components, e.g., strength members, may be embedded in such polyolefin materials to provide structural rigidity but, in certain circumstances, also tend to decrease the bend performance of the optical fiber cable.

SUMMARY

In one aspect, embodiments of the disclosure relate to an optical fiber cable. The optical fiber cable includes a cable jacket having an inner surface and an outer surface in which the inner surface defines a central bore along a longitudinal axis of the optical fiber cable and the outer surface defines the outermost extent of the cable. The optical fiber cable also includes at least one access feature disposed in the cable jacket between the inner surface and the outer surface. Further included are a first plurality of optical fiber bundles. Each optical fiber bundle includes a second plurality of optical fiber ribbons that has a third plurality of optical fibers arranged in a planar configuration. The optical fiber cable bends uniformly in all directions transverse to the longitudinal axis of the optical fiber cable.

In another aspect, embodiments of the disclosure relate to an optical fiber cable including a cable jacket, at least one access feature, a buffer tube, a plurality of strengthening yarns, and a stack of optical fiber ribbons. The cable jacket has a first inner surface and a first outer surface. The first outer surface defines the outermost extent of the cable. The at least one access feature is disposed in the cable jacket between the first inner surface and the first outer surface. The buffer tube has a second inner surface and a second outer surface in which the second inner surface defines a central bore along a longitudinal axis of the optical fiber cable and the second outer surface is at least partially in contact with the first inner surface of the cable jacket. The plurality of strengthening yarns are disposed between the second outer surface of the buffer tube and the first outer surface of the cable jacket. The stack of optical fiber ribbons is disposed within the central bore, and each optical fiber ribbon includes a plurality of optical fibers. The optical fiber cable bends uniformly in all directions transverse to the longitudinal axis of the optical fiber cable.

In yet another aspect, embodiments of the disclosure relate to an optical fiber cable. The optical fiber cable includes a cable jacket having an inner surface and an outer surface. The inner surface defines a central bore along a longitudinal axis of the optical fiber cable and the outer surface defines the outermost extent of the cable. At least one access feature is disposed in the cable jacket between the inner surface and the outer surface. The optical fiber cable also includes a first plurality of optical fiber bundles. Each optical fiber bundle includes a second plurality of optical fiber ribbons, and each optical fiber ribbon includes a third plurality of optical fibers arranged in a planar configuration. A first bundle of two to eight strengthening yarns is disposed in the cable jacket between the inner surface and the outer surface, and a second bundle of two to eight strengthening yarns is disposed in the cable jacket between the inner surface and the outer surface. The first bundle is arranged diametrically from the second bundle.

Additional features and advantages will be set forth in the detailed description that follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION

Referring generally to the figures, various embodiments of optical fiber cables are disclosed that provide substantially uniform bending in all directions transverse to the longitudinal axis of the ribbon cable. As compared to optical fiber cables that do not provide uniform bending (i.e., bend preferentially in certain transverse directions), the embodiments of the optical fiber cables disclosed herein are easier to handle and install in the field. In particular, certain conventional optical fiber cables include strengthening rods, such as metal rods or glass-reinforced plastic rods, that make bending the optical fiber cables in certain directions much more difficult (e.g., requiring 100% to 500% more energy). According to the present disclosure, embodiments of optical fiber cables are provided that do not utilize such strengthening rods. Instead, embodiments of the optical fiber cables according to the disclosure utilize a cable jacket having a low coefficient of thermal expansion (CTE) along with strengthening yarns embedded in the cable jacket or between layers of the optical fiber cable. Such optical fiber cables bend uniformly, i.e., the bending stress in a first direction is within 20%, within 10%, or even within 5% of the bending stress in any other direction transverse to the longitudinal axis. Embodiments of the presently disclosed optical fiber cable construction are particularly suitable for use in optical fiber cables carrying a large number of optical fibers (e.g., 864 to 3456 optical fibers), such as Corning Incorporated's RocketRibbon™ and UltraRibbon™ optical fiber cables. In such cables, the optical fibers are arranged in bundles or stacks of ribbons that provide adequate tensile strength and contraction resistance without the use of strengthening rods. These aspects and advantages will be discussed in greater detail with respect to the following exemplary embodiments. These embodiments are provided for the purpose of illustration and should not be read as limiting.

Figure 1:
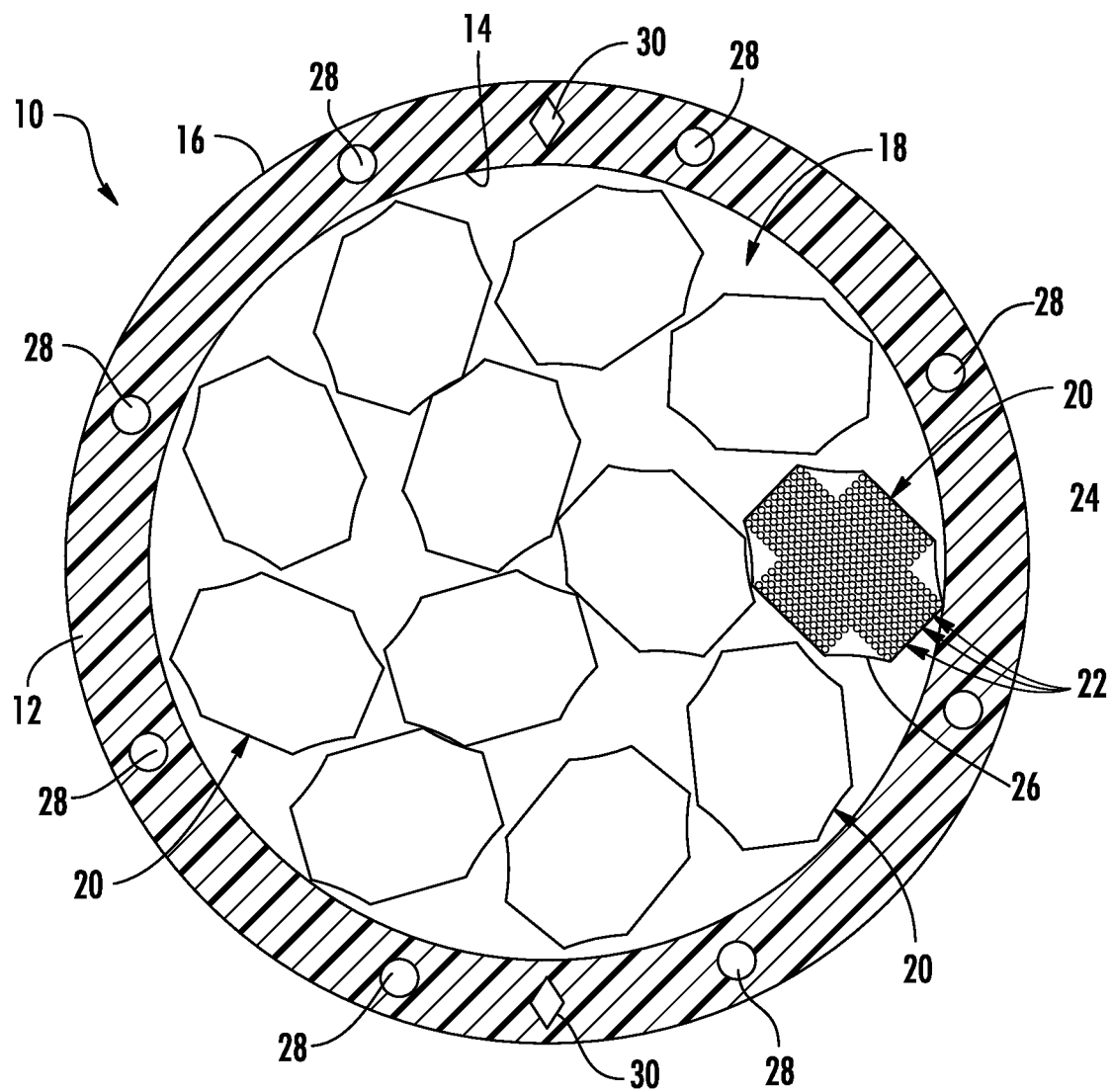
FIG. 1 depicts a central tube, routable subunit ribbon cable, according to an embodiment of the invention.

FIG. 1 depicts a first embodiment of a central tube, routable subunit ribbon cable 10. The ribbon cable 10 includes a cable jacket 12 having an inner surface 14 and an outer surface 16. The inner surface 14 defines a central bore 18, and the outer surface 16 defines an outermost extent of the ribbon cable 14. In embodiments, the outer surface 16 defines an outer diameter of the ribbon cable 10 of from 20 mm to 40 mm. While the term "diameter" is used, the outer surface 16 may not define a circle, and in such instances, "diameter" refers to the largest cross-sectional dimension of the ribbon cable 10. Further, in embodiments, the inner surface 14 and the outer surface 16 define a thickness of the cable jacket 12 of from 1 mm to 10 mm, more particularly from 2 mm to 5 mm.

Disposed within the central bore 18 are a plurality of optical fiber bundles 20. In embodiments, the optical fiber bundles 20 are helically wound, which facilitates bending and coiling of the ribbon cable 10, e.g., enhancing the routability of the ribbon cable 10. In FIG. 1, one optical fiber bundle 20 is shown in detail, while the remaining optical fiber bundles 20 are shown schematically. As can be seen, the optical fiber bundle 20 includes a plurality of ribbons 22. Each ribbon 22 includes a plurality of optical fibers 24 in a planar configuration. The optical fibers 24 may be held in the planar configuration using a ribbon matrix material. As can be seen in FIG. 1, the optical fiber bundles have ribbons 22 with different numbers of optical fibers 24 contained in each ribbon. In particular, the bundles 20 include an upper and lower section having less optical fiber 24 than a middle section. In embodiments, the upper and lower sections each include four ribbons 22 of twelve optical fibers 24 and the middle section includes eight ribbons 22 of twenty-four optical fibers 24 for a total of 288 optical fibers 24 per bundle 20. The ribbons 22 are held in the bundle 20 with a wrap 26, which gives the bundle 20 an octagonal shape. In embodiments, the ribbon cable 10 includes twelve bundles 20 for a total of 3456 optical fibers 24 in the ribbon cable 10.

The cable jacket 12 includes a plurality of strengthening yarns 28 contained within the material of the cable jacket 12 between the inner surface 14 and the outer surface 16. In an embodiment, the ribbon cable 10 includes from four to sixteen strengthening yarns 28 disposed within the cable jacket 12. In a particular embodiment, the cable jacket 12 includes eight strengthening yarns 28. In embodiments, the strengthening yarns 28 are equidistantly spaced around the cable jacket 12; however, in other embodiments, the spacing between any two strengthening yarns 28 may be different from the spacing between at least two other strengthening yarns 28. In embodiments, the strengthening yarns 28 are textile yarns. In particular embodiments, the textile yarns are selected to have, e.g., a density of 1 $g/cm^3$ to 5 $g/cm^3$, an elongation at break of 1% to 5%, a tensile strength of 500 MPa to 5 GPa, and/or a linear density of 1000 dtex to 5000 dtex. Exemplary textile yarns suitable for use as the strengthening yarns include at least one of glass fibers, aramid fibers, cotton fibers, or carbon fibers, among others.

The strengthening yarns 28 can be applied to the ribbon cable 10 in a variety of suitable ways. In an embodiment, the strengthening yarns 28 are substantially straight and parallel to the longitudinal axis along the length of the ribbon cable 10. In such embodiments, the strengthening yarns 28 may be provided with excess fiber length to account for shrinkage in cold weather. In embodiments, the excess fiber length is 0.5% to 5% of the length of the strengthening yarns 28. In other embodiments, the strengthening yarns 28 are helically wound or SZ-stranded within the cable jacket 12. In such embodiments, the strengthening yarns 28 may be applied between two co-extruded layers of the cable jacket 12.

Further, in embodiments, the cable jacket 12 includes an access feature 30, such as a ripcord or strip of polymer material that is dissimilar from the material of the cable jacket 12 (e.g., polypropylene strip in a predominantly polyethylene jacket). In embodiments, the ripcord is a yarn comprised of at least one of a textile fiber (such as those listed above), liquid crystal polymer fibers, or PET polyester fibers, among others. As can be seen in the embodiment of FIG. 1, the ribbon cable 10 includes two access features 30 that are arranged diametrically within the cable jacket 12. In other embodiments, the ribbon cable 10 may include a single access feature 30 or more than two access features 30, such as up to four access features 30. The access features 30 may be positioned such that two strengthening yarns 28 are even spaced around the access feature 30.

Figure 2:
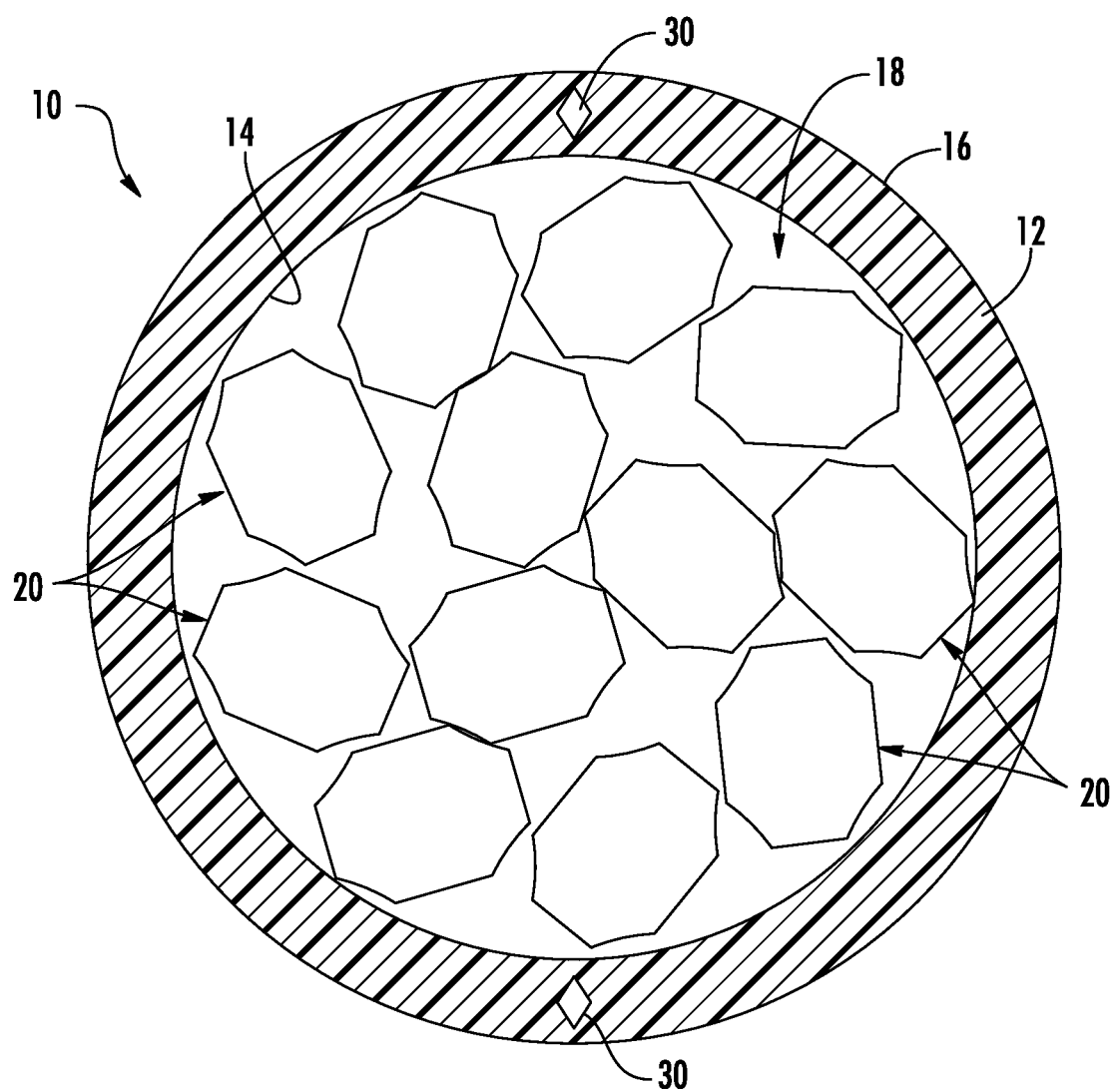
FIG. 2 depicts a central tube, routable subunit ribbon cable, according to another embodiment of the invention.

FIG. 2 depicts another embodiment of a central tube, routable subunit ribbon cable 10. As in the previous embodiment, the ribbon 10 includes a cable jacket 12 having an inner surface 14 and an outer surface 16. The inner surface 14 defines a central bore 18 in which optical fiber bundles 20 are disposed. As depicted in FIG. 2, the central bore 18 includes twelve optical fiber bundles 20, but in other embodiments, the central bore 18 can include more or fewer bundles 20. In embodiments, each bundle 20 can include, e.g., 288 optical fibers 24 arranged in multiple ribbons 22 as shown in FIG. 1. In the embodiment of FIG. 2, the cable jacket 12 includes two access features 30, e.g., ripcords, arranged diametrically. By "diametrically," it is meant that the components are separated by 180° with respect to the circular cross-section of the cable jacket 12. Advantageously, the optical fiber bundles 20 provide adequate tensile strength and contraction resistance despite the lack of strengthening rods in the cable jacket 12.

Further, in the embodiment, of FIG. 2, the cable jacket 12 material has a low CTE. In embodiments, the CTE of the material for the cable jacket 12 is no more than $150 \times 10^{-6}$ m/mK. In other embodiments, the CTE of the material for the cable jacket 12 is no more than $120 \times 10^{-6}$ m/mK, and in certain embodiments, the CTE of the material for the cable jacket 12 is no more than $100 \times 10^{-6}$ m/mK.

In embodiments, the low CTE material for the cable jacket 12 is a polymeric composition comprised of a polyolefin, a thermoplastic elastomer, and at least one filler material. In exemplary embodiments, the polyolefin can include one or more of medium-density polyethylene (MDPE), high-density polyethylene (HDPE), low-density polyethylene (LDPE), linear low-density polyethylene (LLDPE), and polypropylene (PP). In other embodiments, a different polyolefin can also be used. In embodiments, the polymer composition of the cable jacket 12 includes from 30 wt % to 60 wt % of the thermoplastic elastomer. Exemplary thermoplastic elastomers suitable for use in the polymer composition include (but are not limited to) ethylene-propylene rubber (EPR), ethylene-propylene-diene rubber (EPDM), ethylene-octene (EO), ethylene-hexene (EH), ethylene-butene (EB), ethylene-vinyl acetate (EVA), and styrene-ethylene-butadiene-styrene (SEBS), thermoplastic vulcanizates (TPV [e.g., Santoprene available from ExxonMobil Chemical]), polyolefin elastomers (POE), ethylene/alpha-olefin copolymers (e.g., Exact plastomers available from ExxonMobil Chemical) and combinations thereof. In a particular embodiment, thermoplastic elastomer used in the polymer composition has a shear viscosity that is lower than or equal to the shear viscosity of the polyolefin when measured at 200° C. and 100 $s^{-1}$. This property increases the stability of the highly oriented co-continuous morphology during extrusion, maintaining the low CTE advantage disclosed herein.

In an embodiment, the polymeric composition of the cable jacket 12 includes up to 30 wt % of the filler material. The particles of the filler material used in the polymer composition have a high aspect ratio, i.e., a high width to thickness ratio or a high length to width ratio. In an embodiment, the particles of filler material have an aspect ratio of 5 or higher. In specific embodiments, the inorganic fillers can be platelike or fibrous/rodlike. Examples of platelike fillers include mica, talc, montmorillonite (MMT), kaolinite, bentonite, synthetic clay, and other clays. Examples of fibrous/rodlike fillers include wood flour (WF), glass fiber (GF), halloysite, wollastonite, magnesium oxysulfate, and other reinforced fibers.

The polymer composition of the cable jacket 12 can include other processing and/or performance additives. For example, a dispersant and a compatibilizer may be added to aid dispersion of the inorganic filler, to improve compatibilities between polymer matrices, and/or to stabilize the phase morphology. An exemplary compatibilizer would be a block copolymer that has alternating olefin blocks and one or more other monomer blocks. For example, one suitable compatibilizer for SEBS is a copolymer with alternating blocks of polyethylene and styrene-containing segments. In another example, the compatibilizer is a polymer having a polyolefin backbone that is grafted with a monomer in which the monomer is compatible with the selected thermoplastic elastomer. Another possible additive for the polymer composition is carbon black, which can help absorb ultra-violet light for outdoor applications of the polymer composition. Still further, the polymer composition can include up to 1% by weight of a low friction additive, such as a fatty acid or a fatty acid amide. For example, the fatty acid can have a carbon backbone of between $C_6$ to $C_{25}$ and be saturated or unsaturated. Specific examples include caprylic acid, capric acid, lauric acid, myristic acid, palmitic acid, stearic acid, arachidic acid, behenic acid, lignoceric acid, cerotic acid, etc. Similarly, the fatty acid amid can have carbon backbones, for example, of between $C_6$ and $C_{25}$ and be saturated or unsaturated.

In embodiments, the polymer composition is prepared via extrusion or injection molding, which will cause the polymer composition to have either a droplet-dispersed morphology in which elastomer droplets uniformly disperse in polyolefin matrix or a co-continuous morphology in which both elastomer and polyolefin form the continuous phases. Because of the highly directional nature of extrusion and injection molding, the filler material and elastomer phase will be highly orientated along the extrusion/injection direction and will exhibit anisotropic shapes, i.e., a large amount of microfibrils or microlayers are formed and oriented. Because the elastic modulus of the polyolefin will generally be higher than that of the thermoplastic elastomers, the thermal expansion of the thermoplastic elastomer domains is restricted by the polyolefin domains. Additionally, the filler material can be selected or engineered to evenly disperse in both the polyolefin or thermoplastic elastomer phases or selectively localize predominantly in just one of the phases. The anisotropy of the resultant phase morphology reduces the CTE in the extrusion direction, which in the case of a cable jacket is along the longitudinal axis of the cable. In embodiments, the CTE values represent averages taken of measurements of the CTE between −40° C. and 25° C.

In an embodiment, the elastic modulus (alternatively, storage modulus) of the polymer composition at −40° C. as measured by dynamic mechanical analysis (DMA) in accordance with ASTM D4065 is at most 2500 MPa, particularly at most 2000 MPa, and more particularly at most 1500 MPa. In a particular embodiment, the polymer composition has at least one melting temperature of at least 100° C. (i.e., the polymer composition may have multiple melt peaks in which at least one but not all has to be above 100° C.). In embodiments, the polymer composition has a strain break (as measured by ASTM D638) of at least 400% at 23° C., more particularly of at least 600% at 23° C. Further, in embodiments, the polymer composition has a thermal contraction stress of no more than 6 MPa, more particularly no more than 3 MPa. Advantageously, the low CTE cable jacket provides a significant decrease in attenuation as compared to higher CTE cable jackets. In embodiments, the attenuation of the low CTE cable jackets is about 0.06 dB/km as a result of cold weather shrinkage as compared to an attenuation of 25 dB/km for other non-low CTE cable jackets.

Figure 3:
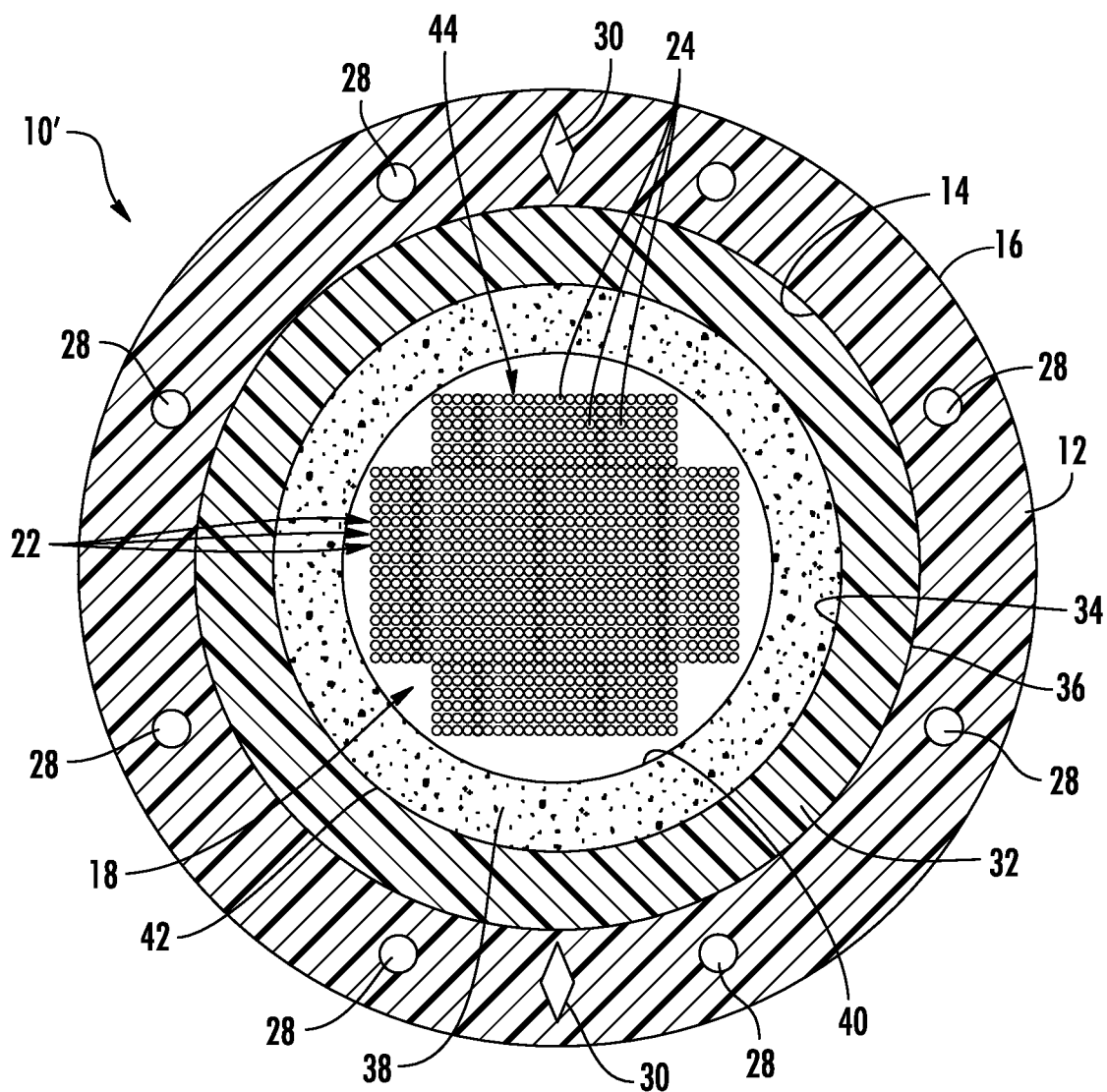
FIG. 3 depicts a central tube ribbon cable, according to an embodiment of the invention.

FIG. 3 depicts an embodiment of a central tube ribbon cable 10'. As can be seen in FIG. 3, the ribbon cable 10' includes a cable jacket 12 having an inner surface 14 and an outer surface 16. Disposed within the cable jacket 12 is a buffer tube 32. In embodiments, the buffer tube 32 is made from a polyolefin material, such as one of the polyolefin materials listed above. The buffer tube 32 has an inner surface 34 and an outer surface 36. In embodiments, the outer surface 36 of the buffer tube 32 is in contact with the inner surface 16 of the cable jacket 12. Disposed within the buffer tube 32 is a water-blocking layer 38 having an inner surface 40 and an outer surface 42. In embodiments, the outer surface 42 is in contact with the inner surface 34 of the buffer tube 32, and the inner surface 40 defines the central bore 18 of the ribbon cable 10'. In embodiments, the water-blocking layer 38 includes, e.g., a superabsorbent polymer (SAP) hotmelt, SAP tape, or SAP powder.

Disposed within the central bore 18 of the ribbon cable 10' is a stack 44 of optical fiber ribbons 22, and each ribbon 22 includes a plurality of optical fibers 24. As shown in FIG. 3, the stack 44 includes an upper section, a middle section, and a lower section. In the embodiment depicted, the upper and lower sections each include six ribbons 22 having twenty-four optical fibers 24, and the middle section includes sixteen ribbons 22 having thirty-six optical fibers 24. Thus, in FIG. 3, the stack 44 includes 864 optical fibers 24. In other embodiments, the upper, middle, and lower sections can include more ribbons 22 and/or optical fibers 24 to provide a greater or fewer total number of optical fibers 24 in the stack 44.

Similarly, to the embodiment of FIG. 1, the central tube ribbon cable 10' includes strengthening yarns 28 in the thickness of the cable jacket 12 between the inner surface 14 and the outer surface 16. In the embodiment depicted, the cable jacket 12 includes eight strengthening yarns 28, but in other embodiments, four to sixteen strengthening yarns 28 may be provided in the cable jacket 12. Further, in the embodiment depicted, the strengthening yarns 28 are equidistantly spaced around the circumference of the cable jacket 12. In other embodiments, the spacing between any two strengthening yarns 28 may be different that the spacing between at least two other strengthening yarns 28. Further, in embodiments, the strengthening yarns 28 may be at least one of helically wound, SZ-stranded, or applied straight along the longitudinal axis with an excess yarn length of 0.5% to 5%. In FIG. 3, the cable jacket 12 also includes two access features 30, such as ripcords, that are diametrically arranged in the cable jacket 12. In other embodiments, the cable jacket 12 may include only one access feature or more than two access features, e.g., up to four access features 30. Further, in embodiments, the cable jacket 12 may be made of the low CTE polymer composition described above.

Figure 4:
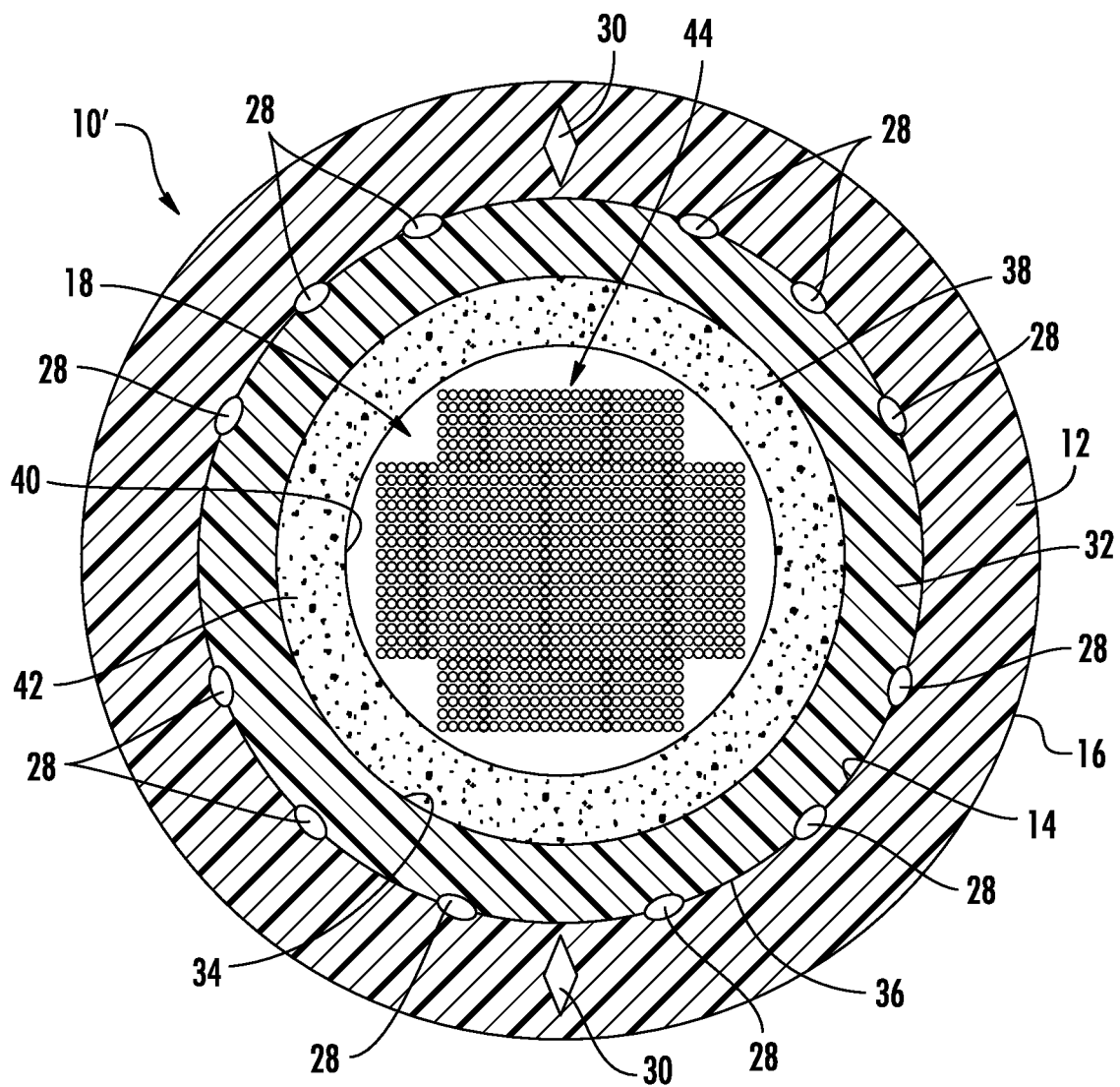
FIG. 4 depicts a central tube ribbon cable, according to another embodiment of the invention.

FIG. 4 depicts another embodiment of a central tube ribbon cable 10' that is substantially the same as the embodiment of FIG. 3 except that the strengthening yarns 28 are located between the outer surface 36 of the buffer tube 32 and the inner surface 14 of the cable jacket 12. In embodiments, the ribbon cable 10' may include from eight to sixteen strengthening yarns 28. In the embodiment depicted, the ribbon cable 10' includes twelve strengthening yarns 28. Further, in embodiments, the strengthening yarns 28 may be at least one of helically wound, SZ-stranded, or applied straight along the longitudinal axis with an excess yarn length of 0.5% to 5%. In the embodiment of FIG. 4, the strengthening yarns 28 may be applied to the outer surface 36 of the buffer tube 32 prior to extrusion of the cable jacket 12. Further, in the embodiment depicted, the strengthening yarns 28 are equidistantly spaced around the circumference of the cable jacket 12. In other embodiments, the spacing between any two strengthening yarns 28 may be different that the spacing between at least two other strengthening yarns 28. For example, in the embodiment depicted, the strengthening yarns 28 are arranged in four groups of three. The spacing between the strengthening yarns 28 within the group is substantially the same, whereas the spacing between groups is larger.

Figure 5:
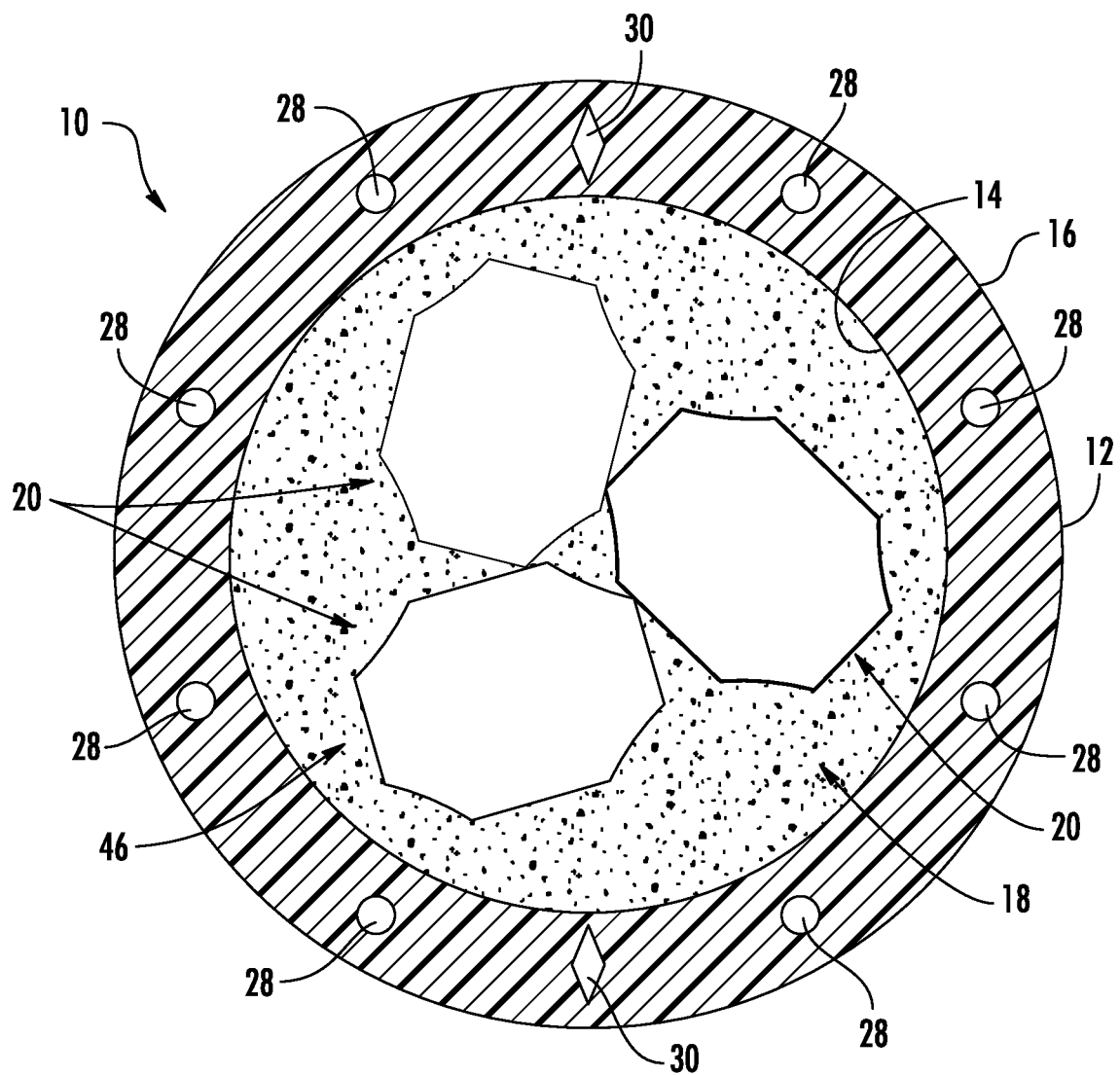
FIG. 5 depicts a central tube, routable subunit ribbon cable, according to another embodiment of the invention.

FIG. 5 depicts another embodiment of a central tube, routable subunit ribbon cable 10. As can be seen in FIG. 5, the construction of the ribbon cable 10 is substantially similar to the embodiment shown in FIG. 1 except for the number of bundles 20 contained in the central bore 18 of the ribbon cable 10 and except for the foamed thermoplastic elastomer (TPE) 46 disposed within the central bore 18 around the bundles 20. The foamed TPE 46 holds the bundles in place within the central bore 18 of the ribbon cable 10. In embodiments, the bundles 20 are helically wound, increasing the routability of the ribbon cable 10. In embodiments, the ribbon cable 10 of FIG. 5 is designed to carry 1000 optical fibers or less arranged in two to five bundles 20. As shown in FIG. 5, three bundles 20 are provided, and in embodiments in which each bundle 20 contains 288 optical fibers, the ribbon cable 10 would contain 864 optical fibers in total.

In embodiments, the ribbon cable 10 of FIG. 5 includes from four to twelve strengthening yarns 28 equidistantly or variably spaced around the cable jacket 12. In the embodiment depicted in FIG. 5, the ribbon cable 10 includes eight strengthening yarns 28 equidistantly spaced around the cable jacket 12 and two access features 30 arranged diametrically. Further, in embodiments, the strengthening yarns 28 may be at least one of helically wound, SZ-stranded, or applied straight along the longitudinal axis with an excess yarn length of 0.5% to 5%. In embodiments, the cable jacket 12 may be made of the low CTE polymer composition described above.

Figure 6:
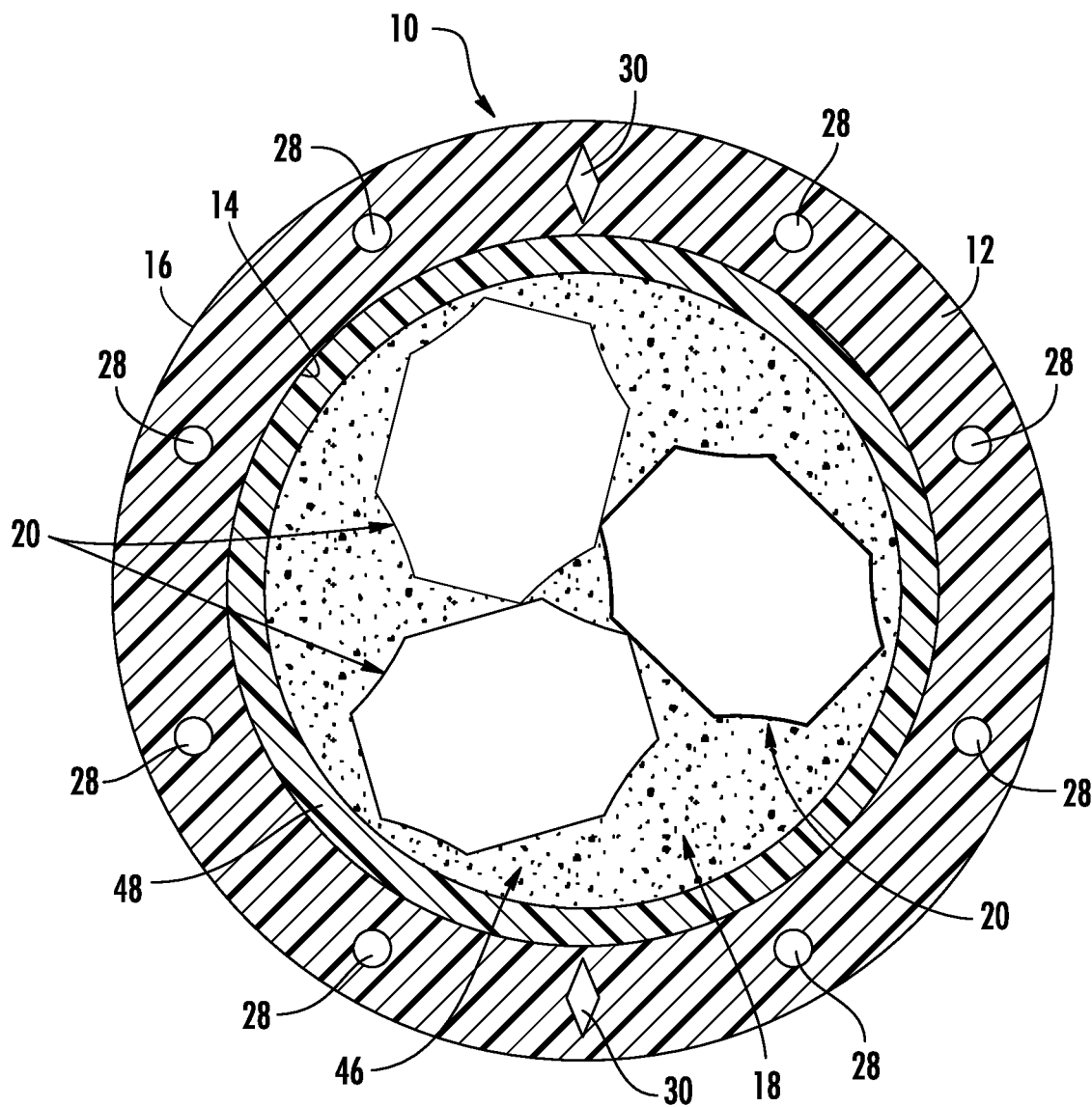
FIG. 6 depicts a central tube, routable subunit ribbon cable having an armor layer, according to an embodiment of the invention.

FIG. 6 depicts an embodiment of a central tube, routable subunit ribbon cable 10 that is substantially similar to the embodiment depicted in FIG. 5 except for the inclusion of an armor layer 48. In embodiments, the armor layer 48 includes, e.g., a wrapped metal tape and/or metal strands. In embodiments, the armor layer 48 is corrugated and/or of a two-piece construction. Contained within the armor layer 48 are the optical fiber bundles 20 and, in the embodiment depicted, the foamed TPE 46. The armor layer 12 is surrounded by the cable jacket 12 in which a plurality of strengthening yarns 28 and/or access features 30 are embedded. In embodiments, the plurality of strengthening yarns 28 is from four to sixteen strengthening yarns 28, and in embodiments, the cable jacket 12 includes from one to four access features 30, e.g., two access features 30 that are arranged diametrically. Further, in embodiments, the strengthening yarns 28 may be at least one of helically wound, SZ-stranded, or applied straight along the longitudinal axis with an excess yarn length of 0.5% to 5%. Still further, in embodiments, the cable jacket 12 is made of the low CTE polymer composition described above.

Figure 7:
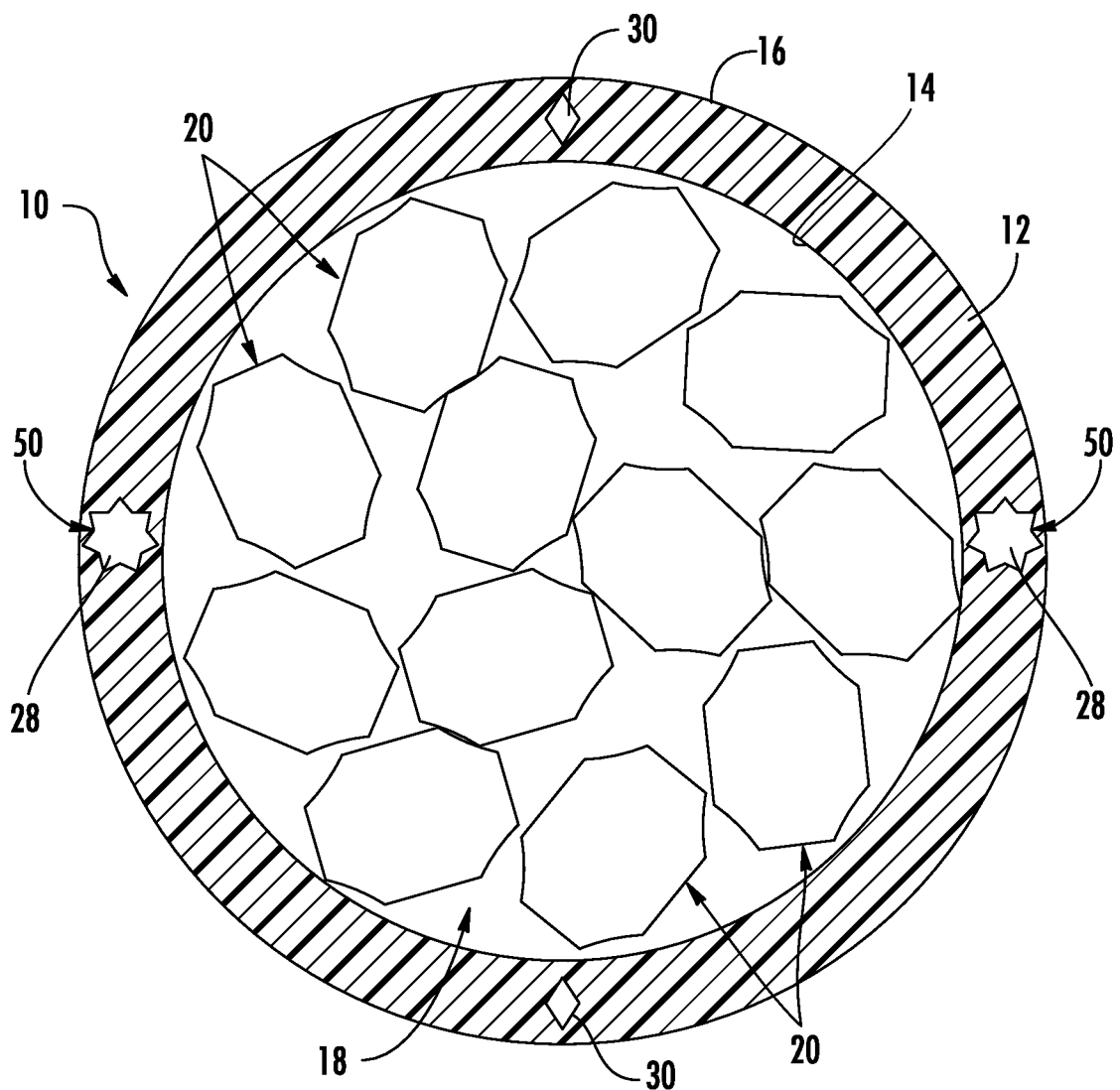
FIG. 7 depicts a central tube, routable subunit ribbon cable, according to another embodiment of the invention.

FIG. 7 depicts another embodiment of a central tube, routable subunit ribbon cable 10. The embodiment of FIG. 7 is substantially similar to the embodiment of FIG. 2 except for the bundles 50 of strengthening yarns 28 contained in the cable jacket 12. In embodiments, the cable jacket 12 includes from two to four bundles 50. Further, in embodiments, each bundle 50 include from two to eight strengthening yarns 28. In embodiments, the strengthening yarns 28 are braided or wound in each bundle 50. In the embodiment depicted, the cable jacket 12 includes two bundles 50 that are arranged diametrically, and each bundle 50 includes eight strengthening yarns 28. In embodiments, the cable jacket 12 also include one or more access feature 30, e.g., from one to four access features 30. In the embodiment depicted, the cable jacket 12 includes two access features 30 that are arranged diametrically. Further, in terms of angular position within the cable jacket 12, the bundles 50 are located at the 0° and 180 positions, and the access features 30 are located at the 90° and 270° positions. Further, in embodiments, the cable jacket 12 is made of the low CTE polymer composition described above.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical fiber cable comprising:
    a cable jacket comprising an inner surface and an outer surface, the inner surface defining a central bore along a longitudinal axis of the optical fiber cable and the outer surface defining an outermost extent of the optical fiber cable;
    at least one access feature disposed in the cable jacket between the inner surface and the outer surface;
    a plurality of optical fiber bundles, each of the optical fiber bundles comprising a plurality of optical fiber ribbons held in the optical fiber bundle with a wrap, each of the optical fiber ribbons comprising a plurality of optical fibers arranged in a planar configuration;
    a plurality of strengthening yarns disposed in the cable jacket between the interior surface and the exterior surface;
    wherein the optical fiber cable bends uniformly in all directions transverse to the longitudinal axis of the optical fiber cable;
    wherein the plurality of strengthening yarns comprise a linear density of 1000 dtex to 5000 dtex;
    wherein each of the optical fiber bundles comprises a first section, a second section, and a third section, the first section and the second section each comprising optical fiber ribbons each having a first number of optical fibers, the third section being disposed between the first section and the second section and comprising optical fiber ribbons each having a second number of optical fibers, the second number being greater than the first number; and
    wherein the wrap defines an octagonal shape for each of the optical fiber bundles.

2. The optical fiber cable of claim 1, wherein the plurality of strengthening yarns is at least one of helically wound, SZ-stranded, or applied straight along the longitudinal axis with an excess yarn length of 0.5% to 5%.

3. The optical fiber cable of claim 1, wherein the plurality of strengthening yarns comprises at least one of glass fibers, aramid fibers, cotton fibers, or carbon fibers.

4. The optical fiber cable of claim 1, wherein the plurality of strengthening yarns are equidistantly spaced around a circumference of the cable jacket.

5. The optical fiber cable of claim 1, wherein the plurality of strengthening yarns comprises from four to sixteen strengthening yarns.

6. The optical fiber cable of claim 1, wherein the plurality of optical fiber bundles comprises from 3 to 5 optical fiber bundles, wherein a total number of the optical fibers in the optical fiber cable is no more than 1000, and wherein a water blocking material is disposed in the central bore between the plurality of optical fiber bundles and the inner surface of the cable jacket.

7. The optical fiber cable of claim 6, further comprising an armor layer having an inner surface and an outer surface, wherein the outer surface of the armor layer is in contact with the inner surface of the cable jacket, and wherein the water blocking material is disposed in the central bore between the plurality of optical fiber bundles and the inner surface of the armor layer.

8. The optical fiber cable of claim 1, wherein the cable jacket comprises a material having an average coefficient of thermal expansion (CTE) along the longitudinal axis of less than or equal to $150 \times 10^{-6}$ m/mK as measured from $-40°$ C. to $25°$ C.

9. The optical fiber cable of claim 8, wherein the material comprises 40 wt % to 70 wt % of a polyolefin, 30 wt % to 60 wt % of a thermoplastic elastomer, and up to 30 wt % of a filler material.

10. The optical fiber cable of claim 9, wherein the polyolefin comprises at least one of medium-density polyethylene, high-density polyethylene, low-density polyethylene, linear low-density polyethylene, or polypropylene.

11. The optical fiber cable of claim 9, wherein the thermoplastic elastomer comprises at least one of ethylene-propylene rubber, ethylene-propylene-diene rubber, ethylene-octene, ethylene-hexene, ethylene-butene, ethylene-vinyl acetate, styrene-ethylene-butadiene-styrene, thermoplastic vulcanizates, polyolefin elastomers, or ethylene/alpha-olefin copolymers.

12. The optical fiber cable of claim 9, wherein the filler material comprises at least one of mica, talc, montmorillonite, kaolinite, bentonite, synthetic clay, wood flour, glass fiber, halloysite, wollastonite, or magnesium oxysulfate.

13. The optical fiber cable of claim 1, wherein the at least one access feature comprises a rip cord.

14. The optical fiber cable of claim 1, wherein the at least one access feature comprises a strip of a first polymer composition, wherein the cable jacket comprises a second polymer composition, and wherein the first polymer composition is different from the second polymer composition.

15. The optical fiber cable of claim 1, further comprising a foamed thermoplastic elastomer disposed within the central bore around the plurality of optical fiber bundles.

* * * * *